Sept. 28, 1948.  A. SIMMON ET AL  2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946  11 Sheets-Sheet 2
Fig: 2
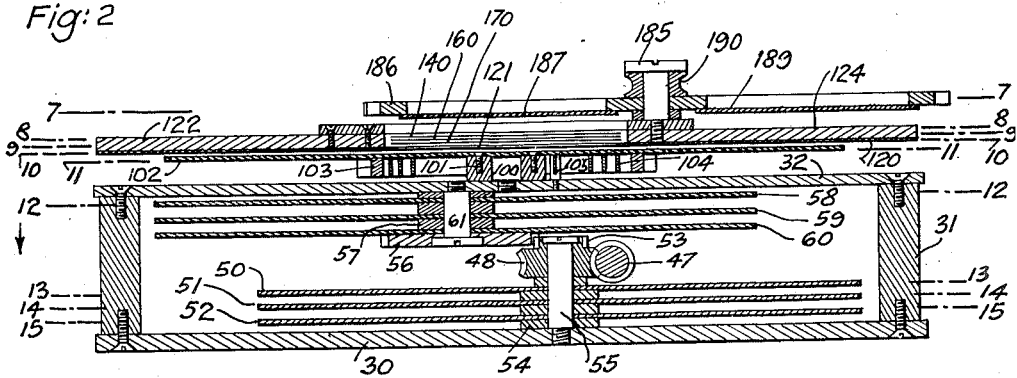
Fig: 3
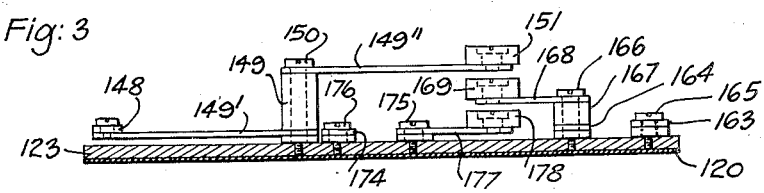
Fig: 4
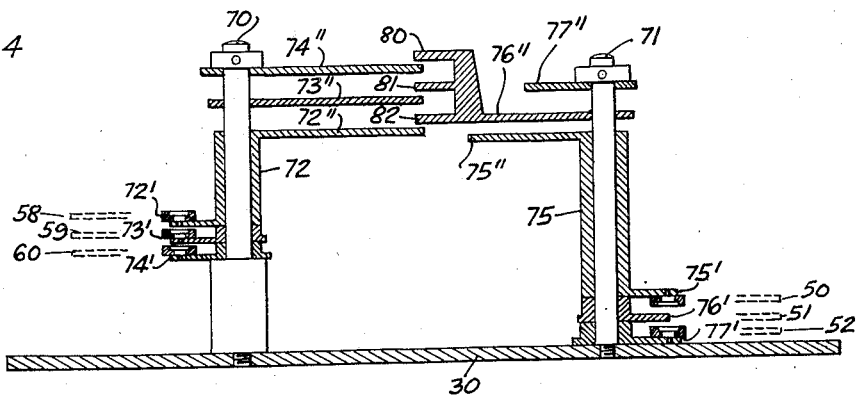
Alfred Simmon
Louis L. Weisglass
INVENTORS
BY Walter E. Wallheim
ATTORNEY.

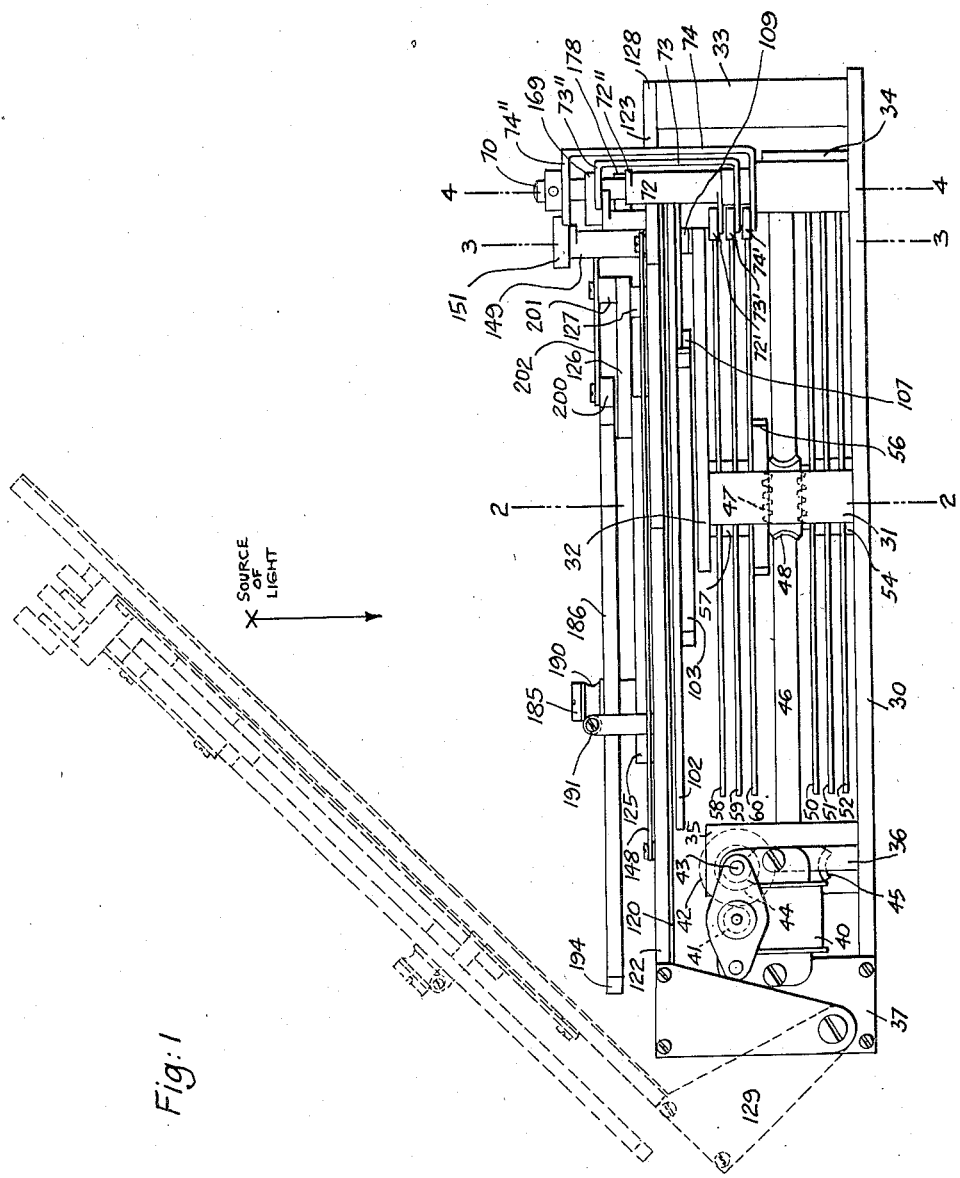

Sept. 28, 1948.   A. SIMMON ET AL   2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946   11 Sheets-Sheet 3
Fig: 5a
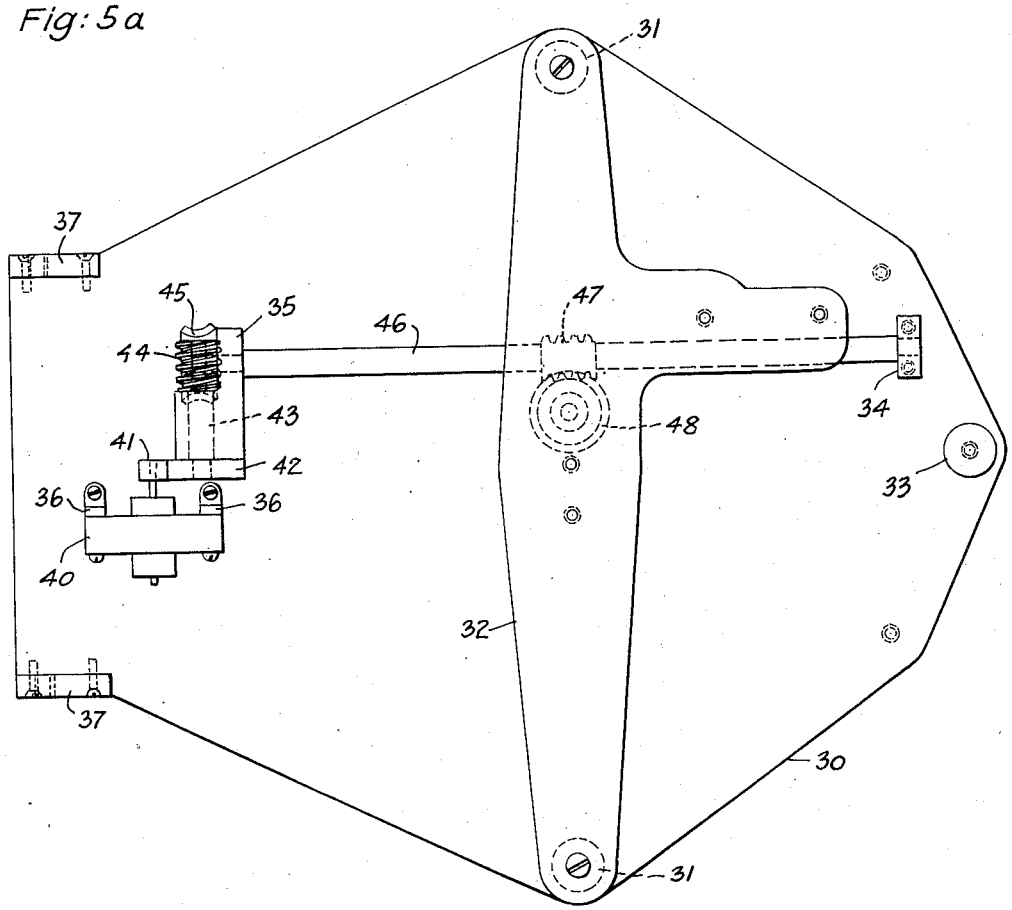
Fig: 5b
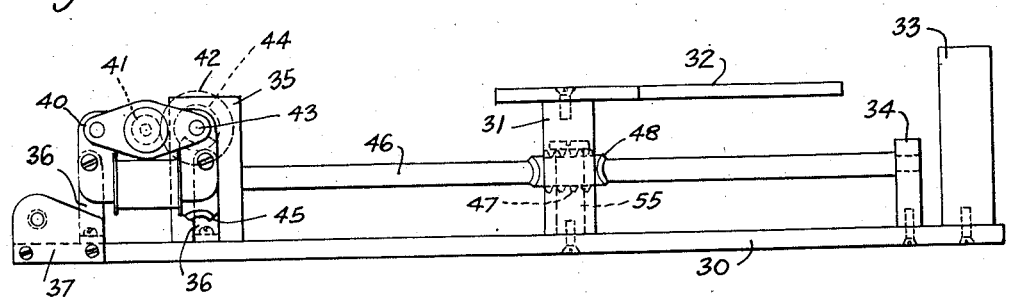
Alfred Simmon
Louis L. Weisglass
INVENTORS
BY Walter E. Wallheim
ATTORNEY.

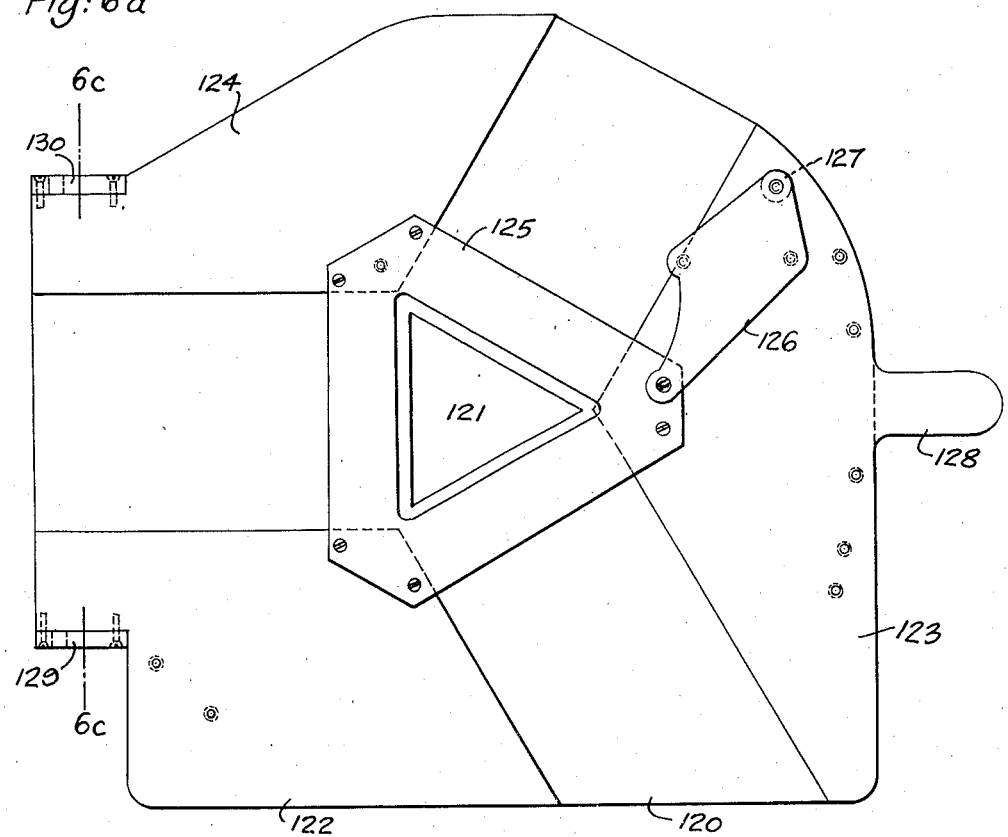
Fig: 6a
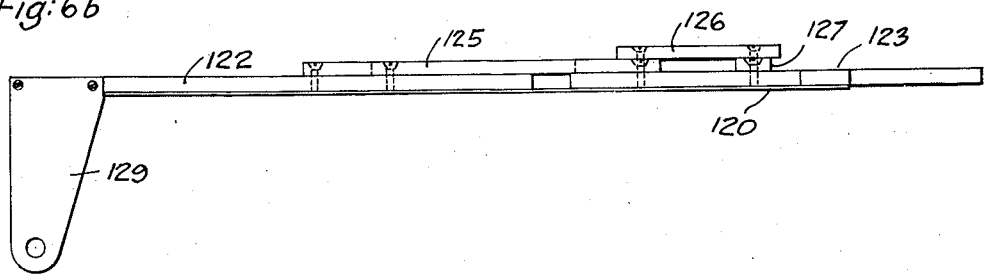
Fig: 6b
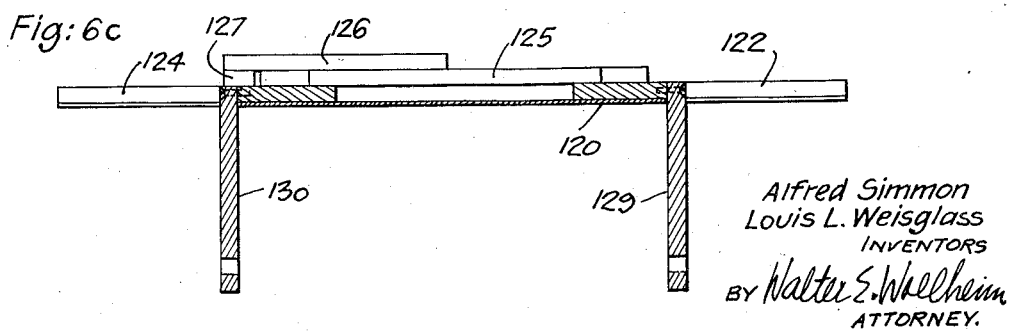
Fig: 6c

Sept. 28, 1948.                    A. SIMMON ET AL                        2,450,307
            DEVICE TO MAKE TEST PRINTS OF PHOTOGRAPHIC COLOR PRINT
                  MATERIAL BY THREE NONUNIFORM PART EXPOSURES
                        OF A TEST TRIANGLE TO THREE COLORS
Filed Aug. 15, 1946                                          11 Sheets-Sheet 5
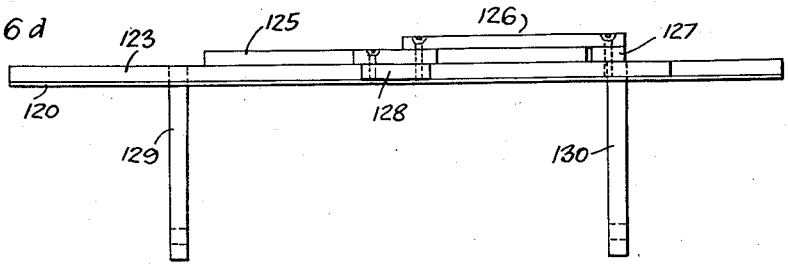
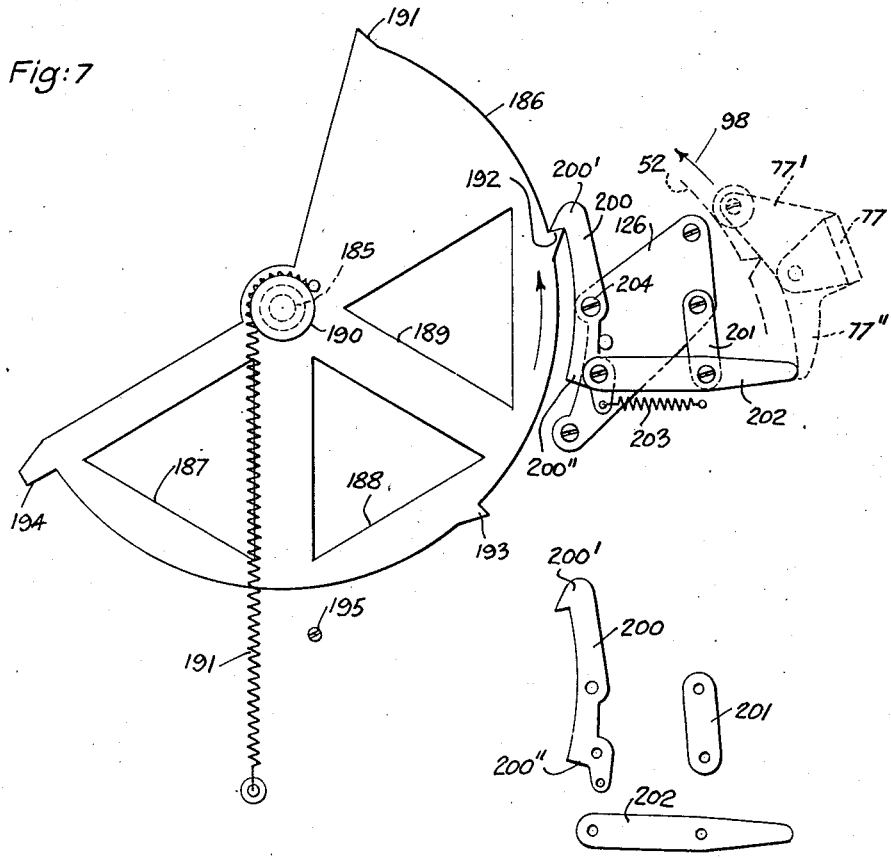
Alfred Simmon
Louis L. Weisglass
INVENTORS
BY Walter E. Wollheim
ATTORNEY.

Sept. 28, 1948.    A. SIMMON ET AL    2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946    11 Sheets-Sheet 6
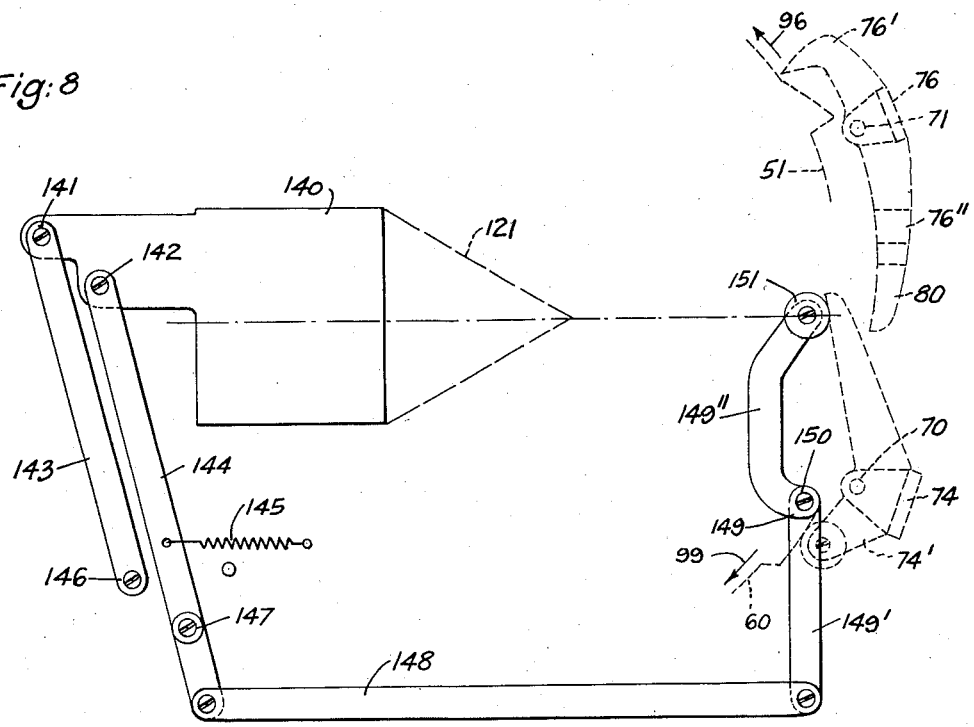
Fig: 8
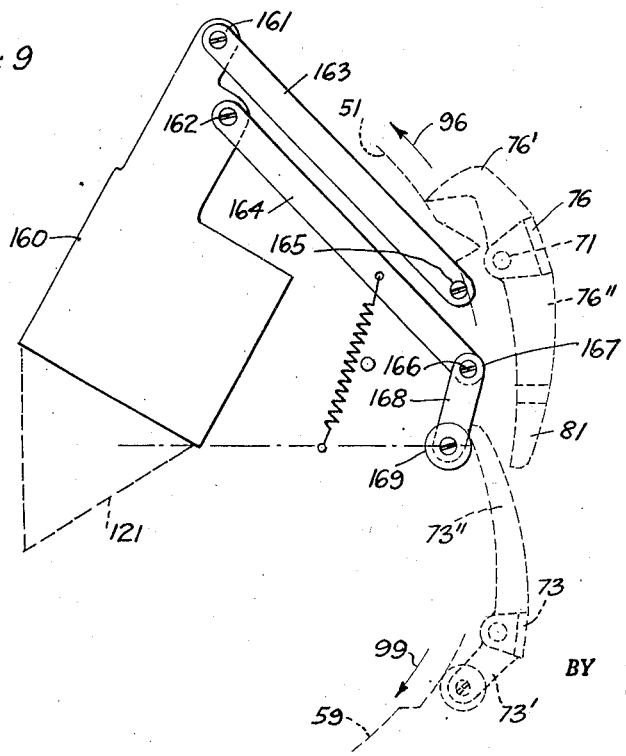
Fig: 9
Alfred Simmon
Louis L. Weisglass
INVENTORS
BY Walter E. Wallheim
ATTORNEY.

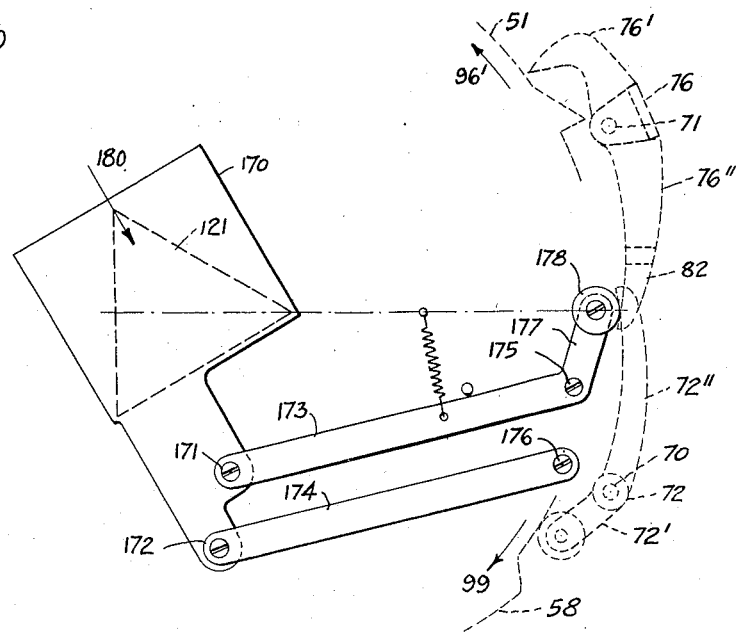
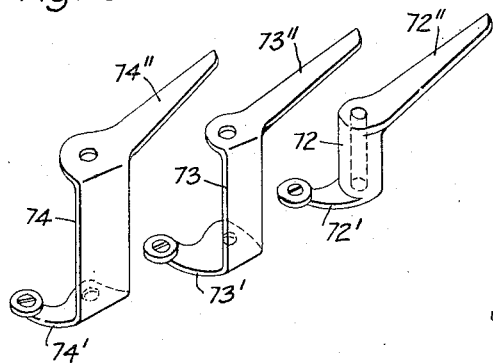
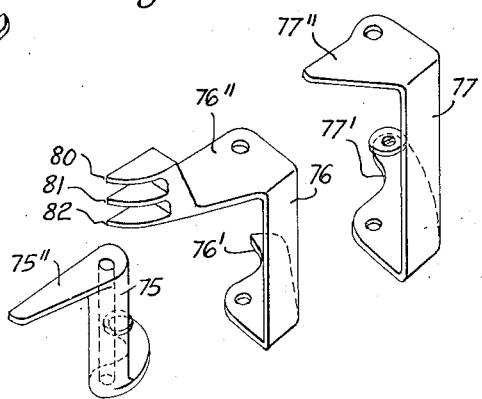

Sept. 28, 1948.  A. SIMMON ET AL  2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946  11 Sheets-Sheet 8
Fig: 11
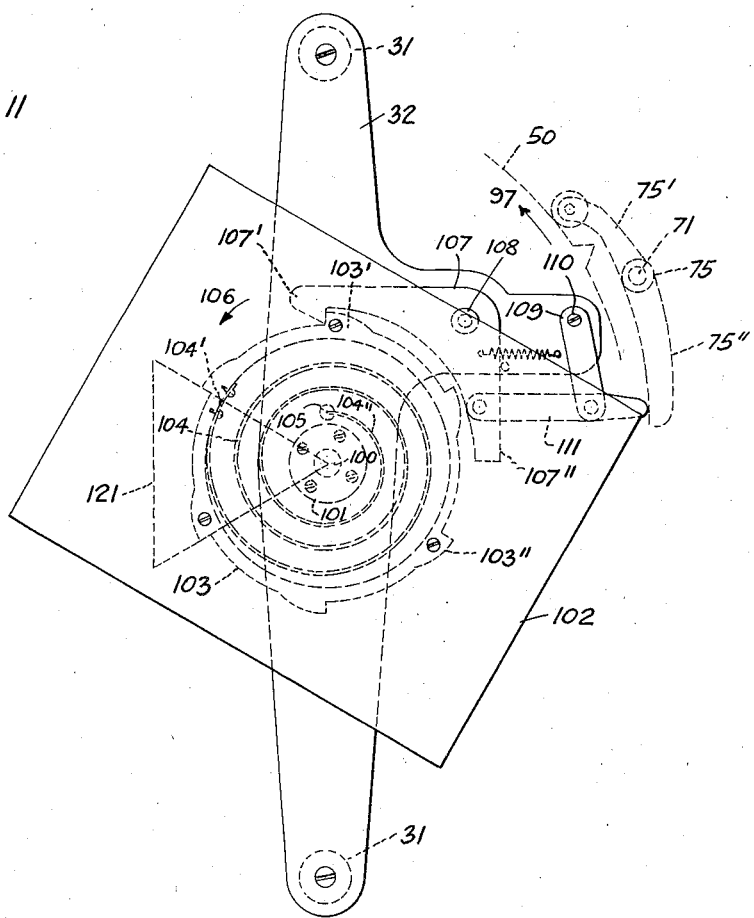
Fig: 19
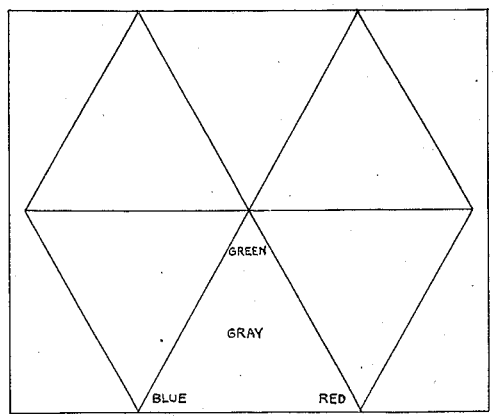
Alfred Simmon
Louis L. Weisglass
INVENTORS
BY Walter E. Wollheim
ATTORNEY.

Sept. 28, 1948. A. SIMMON ET AL 2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946 11 Sheets-Sheet 9

Alfred Simmon
Louis L. Weisglass
INVENTORS

BY Walter E. Wallheim

ATTORNEY.

Sept. 28, 1948. A. SIMMON ET AL 2,450,307
DEVICE TO MAKE TEST PRINTS OF PHOTOGRAPHIC COLOR PRINT
MATERIAL BY THREE NONUNIFORM PART EXPOSURES
OF A TEST TRIANGLE TO THREE COLORS
Filed Aug. 15, 1946     11 Sheets-Sheet 10

Alfred Simmon
Louis L. Weisglass
INVENTORS

BY *Walter E. Wollheim*

ATTORNEY.

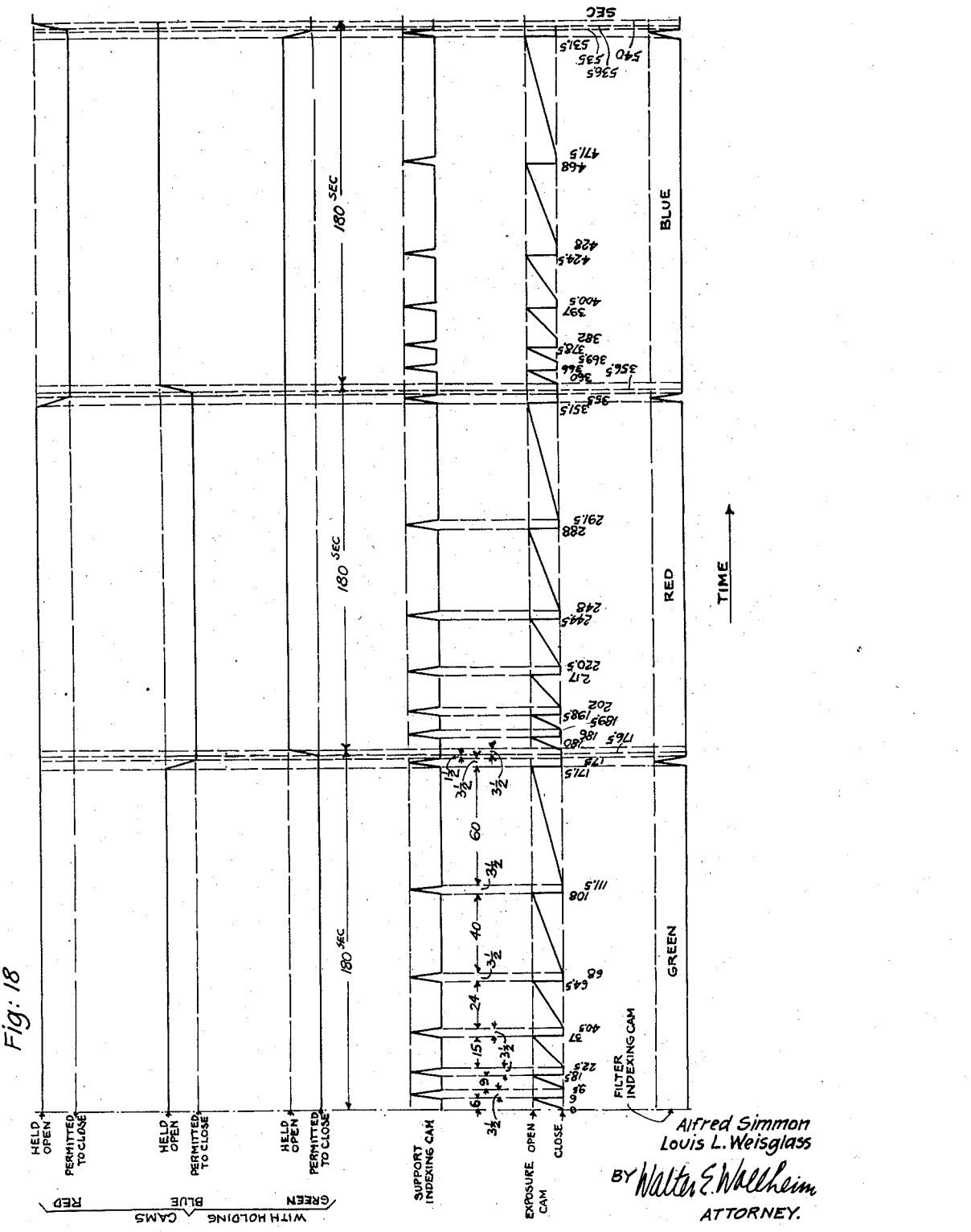

Patented Sept. 28, 1948

2,450,307

UNITED STATES PATENT OFFICE 2,450,307

DEVICE TO MAKE TEST PRINTS OF PHOTOGRAPHIC COLOR PRINT MATERIAL BY THREE NONUNIFORM PART EXPOSURES OF A TEST TRIANGLE TO THREE COLORS

Alfred Simmon, Jackson Heights, and Louis L. Weisglass, New York, N. Y., assignors to Simmon Brothers, Inc., Long Island City, N. Y., a corporation of New York Application August 15, 1946, Serial No. 690,687

13 Claims. (Cl. 95—10)

Photographic color print material is, at the present time, made of two principal types which may be called the monopack and the separation-transfer type, respectively. In the monopack, a plurality of sensitized emulsions, usually three, are coated on a common base. Each of these emulsions is sensitized to one primary color only and is adapted later, during the processing of the monopack, to be dyed with an appropriate color. Distinguished herefrom, the separation-transfer process necessitates the making of three separate prints, usually from three separation negatives in the three primary colors, on three separate sheets. During the processing these sheets are developed, dyed in appropriate colors, and eventually all three images are transferred to a common base. It is the purpose of this invention to provide a mechanical device for the testing of color print material of the monopack type.

Sensitized material for ordinary black and white photography is generally tested by making a so-called stepwedge print. By a stepwedge print we usually understand an elongated strip of such material divided into a fairly large number of small rectangular areas which are subjected in some manner to a steadily increasing or decreasing exposure to white light. The relative densities obtained by this method enable us to judge the properties of this material.

The application of this principle to color print material is not quite simple since it is not sufficient to make, for example, three stepwedge prints with the three primary colors, respectively, because for really complete information it is necessary to provide some means by which we can obtain areas which are exposed to any conceivable combination of three respective exposure times for the three primary colors. In order to do this, we replace according to this invention each rectangular area of a stepwedge print by a triangle which is being exposed non-uniformly to three part exposures with the three primary colors, respectively. Each corner of this triangle receives full exposure of one color, the side of the triangle opposite this corner receives no exposure of this particular color, and intermediate points receive intermediate exposures which are timed in proportion to the distance of each point from said side of the triangle. A triangle exposed in this manner will show the three corners in bright colors, usually red, blue and green. The luminosity of these colors diminishes gradually as we approach the center, and the center should show, with a well-balanced material, a neutral gray. If the exposure times to which each point of the triangle has been exposed for each color increases in linear proportion from each side of the triangle to its opposite corner, the sum of the three exposure times will be constant over the entire area of the triangle. An infinite number of such triangles is conceivable, depending upon the magnitude of said sum. In reality, of course, we have to compromise and be satisfied with a relatively small number of triangles, but even a small number will give adequate information about the behavior of the color print material if the sum of the three exposure times for each triangle follows a suitable, usually geometric, progression, and if thereby a sufficient range of exposure time is being covered.

It is the purpose of this invention to provide mechanical means by which a plurality of triangular areas, preferably on the same sheet, can be subjected to the treatment outlined in the preceding paragraph, i. e., each triangle will be exposed to three part exposures of three colors, the part exposures being non-uniform over the area of the triangle and decreasing from 100% for each corner to 0% for each opposite side. Each point within the triangle thereby receives three part exposures to three different colors, and the sum of these part exposures is constant for each triangle. The sum of the three part exposures, however, changes from triangle to triangle, and a series of such triangles in which the sum of the three part exposures ranges from a minimum to a maximum gives complete information upon the behavior of this color print material under all conceivable exposure conditions.

A preferred embodiment of this invention is illustrated in the accompanying drawings, in which Fig. 1 is a side view of the device, shown in solid lines in the working condition and in dotted lines in a condition in which it can receive a new piece of color print material;

Figs. 2, 3 and 4 are cross-sectional views of the device along the planes, respectively, of lines 2—2, 3—3 and 4—4 in Fig. 1;

Figs. 5a and 5b are a plan view and a side view, respectively, of the base including the motor drive, the base representing one of the principal parts of the supporting structure of the device;

Figs. 6a, 6b, 6c and 6d show the second principal part of said supporting structure, Figs. 6a and 6b being a plan and a side view, respectively, Fig. 6c being a cross-sectional view along the plane of line 6c—6c in Fig. 6a, and Fig. 6d being a front view;

Fig. 7 shows a rotatable and indexing filter mount, substantially in plane of line 7—7 in Fig. 2;

Figs. 8, 9 and 10 show three movable exposure or masking slides, substantially in planes of lines 8—8, 9—9 and 10—10, respectively, of Fig. 2;

Fig. 11 shows the rotating and indexing support for the color print material substantially in plane of line 11—11 in Fig. 2;

Fig. 12 shows one of the withholding cams for the masking slides; Fig. 13 shows a cam which actuates the indexing movement of the support shown in Fig. 11; Fig. 14 shows a cam actuating the exposure slides; Fig. 15 shows a cam actuating the filter rotating and indexing movement; all views of the cams shown in Figs. 12, 13, 14 and 15 are shown along the planes of lines 12—12, 13—13, 14—14 and 15—15, respectively, in Fig. 2.

Figs. 16 and 17 are exploded views of the two lever assemblies which transmit movements from the cams to the filter mount, the exposure slides and the support for the color print material, respectively;

Fig. 18 is a diagram illustrating schematically the motions controlled by the cams; and Fig. 19 is a schematic view of the test prints obtained by this machine.

Like characters of reference denote similar parts throughout the several views and the following specification.

General design

Figure 13:
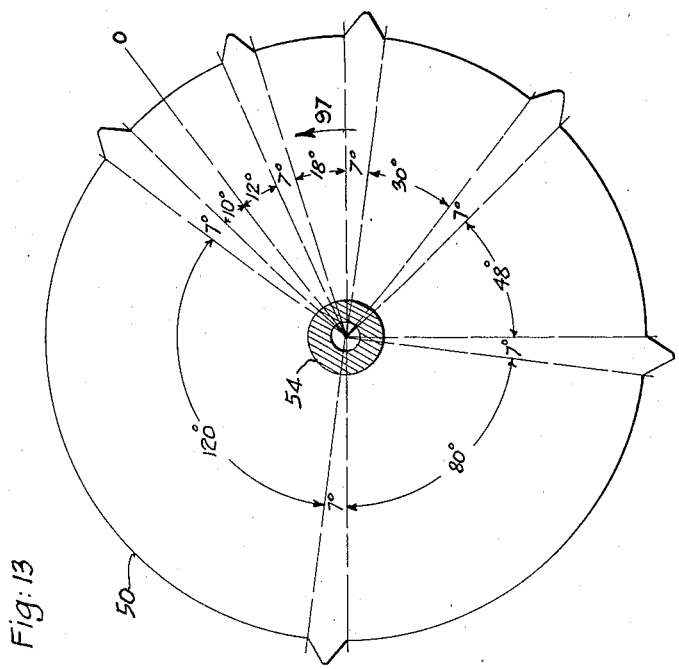

A preferred embodiment of the device comprises a supporting structure made from two principal parts, the base and the hinged top. The base supports the following component parts: Motor drive, cam assembly, lever assembly, and support for color print material. The hinged top supports the following component parts: An aperture plate with a triangular aperture, three masking slides with their associated movements, and a filter unit supporting three color filters.

Base

The base as shown in detail in Figs. 5a and 5b comprises a lower plate 30 to which, by means of two studs 31, an upper plate 32 is fastened. The right end of plate 30 carries a spacer 33 on which latter the hinged top can rest during operation. Also fastened to plate 30 are bearing blocks 34 and 35 for the worm gear shaft which forms part of the motor drive, and two brackets 36 which support the electric motor to be described later. Two lugs 37 are provided on the left side of plate 30, these lugs forming a hinge to which the hinged top can be attached.

Motor drive

The motor drive comprises a motor and a train of gears. The motor is preferably of the shaded coil, synchronous type which makes 3600 R. P. M., and is designated 40 in Figs. 5a and 5b. This motor drives a gear 41 which meshes with another gear 42, these gears in the present example having a ratio of 1:3. Gear 42 is attached to the shaft 43, the other end of which drives a worm 44. This worm 44 meshes with a worm gear 45 which drives by means of shaft 46 a second worm 47. The second worm, in turn, is in mesh with a second worm gear 48. In the present example the worm gears 45 and 48 have 60 teeth each, and the worms 44 and 47 are of the single pitch type. The ratio of transmission for each worm gear assembly is, therefore, 1:60, and worm 48 will make one revolution for each 10,800 revolutions of motor 40; $3 \times 60 \times 60 = 10,800$, or worm 48 will make one revolution in three minutes.

Cam assembly

The cam assembly can best be seen in Fig. 2. It comprises two sub-assemblies, each of which, in turn, comprises three cams. As can be seen in Fig. 2, worm gear 48 is directly associated with three cams 50, 51 and 52. Also fastened to worm gear 58 is a small spur gear 53. Spur gear 53, worm gear 58 and the three cams 50, 51 and 52 form together with spacers 54 a unit which rotates on pivot 55. The small spur gear 53 meshes with a larger spur gear 56 which drives three other cams 58, 59 and 60 which are separated by spacers 57. Spur gear 56, spacers 57 and cams 58, 59 and 60 rotate as a unit on pivot 61. As can be seen, pivot 55 is fastened to base plate 30, and pivot 61 is fastened to plate 32. The ratio between gears 53 and 56 is again 1:3. Therefore, the first three cams 50, 51 and 52 makes one revolution in three minutes, and the other three cams 58, 59 and 60 make one revolution in nine minutes. The figures are, of course, used merely as an example and other times and proportions are perfectly possible.

The shape of the cams can be seen in Figs. 12, 13, 14 and 15. Most important is the shape of cam 51 shown in Fig. 14. This cam is substantially circular in shape and carries on its circumference a number of spiral shaped abutments 90, 91, 92, 93, 94 and 95. The shape of these abutments is determined by spirals which are of the type that has a linear equation in a system of polar coordinates, i. e., the radius increases in linear proportion with the angle; these spirals are sometimes called Archimedes spirals. As can be seen from Fig. 14, the radial increment of all these spirals is the same, but this increment is distributed over different angles, for example, the shortest abutment 90 occupies only an angle of 12°, whereas the longest abutment 95 occupies an angle of 120°. It can also be seen that the angles occupied by these spirals increase substantially in geometric progression, each angle being approximately 1.6 times as large as the angle of the preceding spiral. These spiral shaped cam abutments cooperate with lever 76 or, more specifically, with the lower arm 76' of this lever. This lever, in turn, actuates the masking slides propelling them at a uniform rate of speed, this rate of speed, however, being different for each cam abutment. Between subsequent cam abutments there is a gap of 7° where the cam circumference is circular, i. e., has a constant radius. During these gaps cam 51 will not actuate any of the masking slides, and time is thereby provided for the rotating and indexing movements of the support for the photographic color print material and for the filter holder. During operation, cam 51 rotates in the direction of arrow 96.

Cam 50 is shown in Fig. 13. This cam is substantially circular in shape and carries on its circumference a number of projections, six in this example. By comparing Fig. 13 with Fig. 14 it can be noted that these projections are so disposed that they occupy the spaces between subsequent spiral shaped cam abutments of cam 51. It is the purpose of the projections of cam 50 to release the rotating and indexing movement of the support that carries the photographic color print material. During operation, this cam rotates in the direction of arrow 97.

Figure 15:
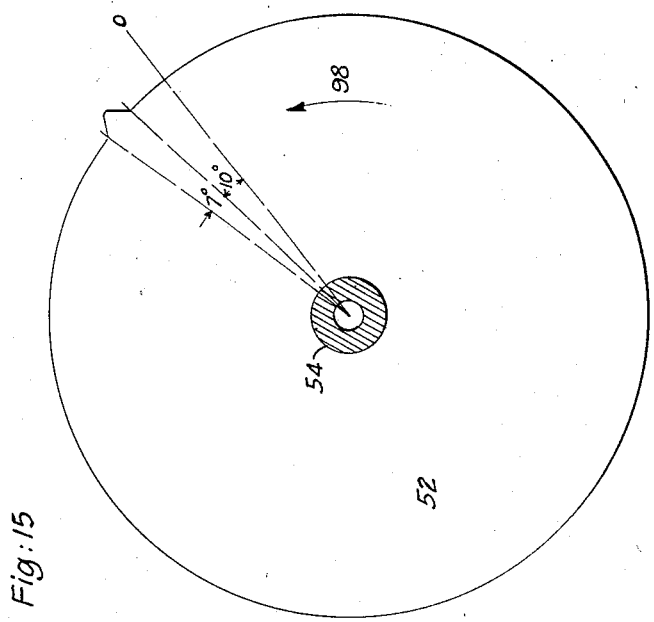
Figure 14:
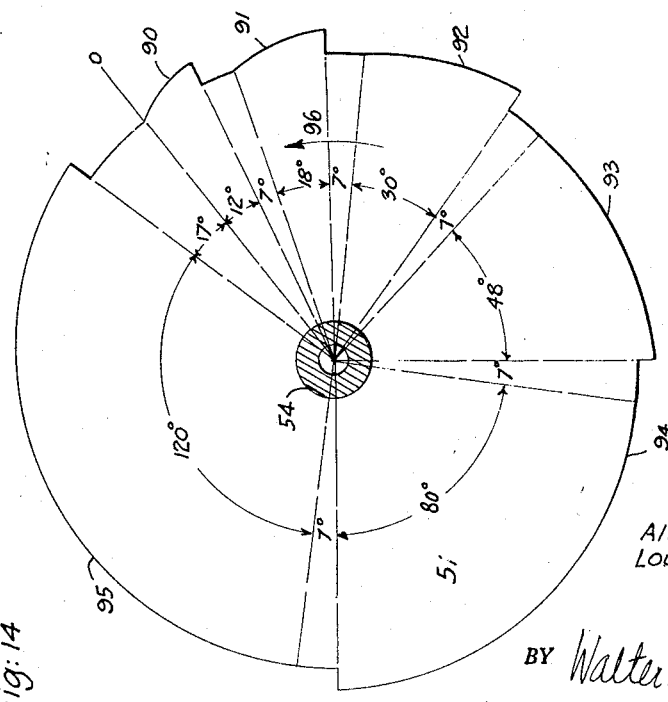

Cam 52 is shown in Fig. 15 and is very similar to cam 50, but carries only one projection which is so disposed that it falls into the gap between the shortest cam abutment 90 and the longest cam abutment 95 of cam 51 as can be seen by comparing Figs. 14 and 15. During operation, this cam rotates in the direction of arrow 98, and it is the purpose of this cam to release the rotating and indexing movement of the filter holder.

Figure 12:
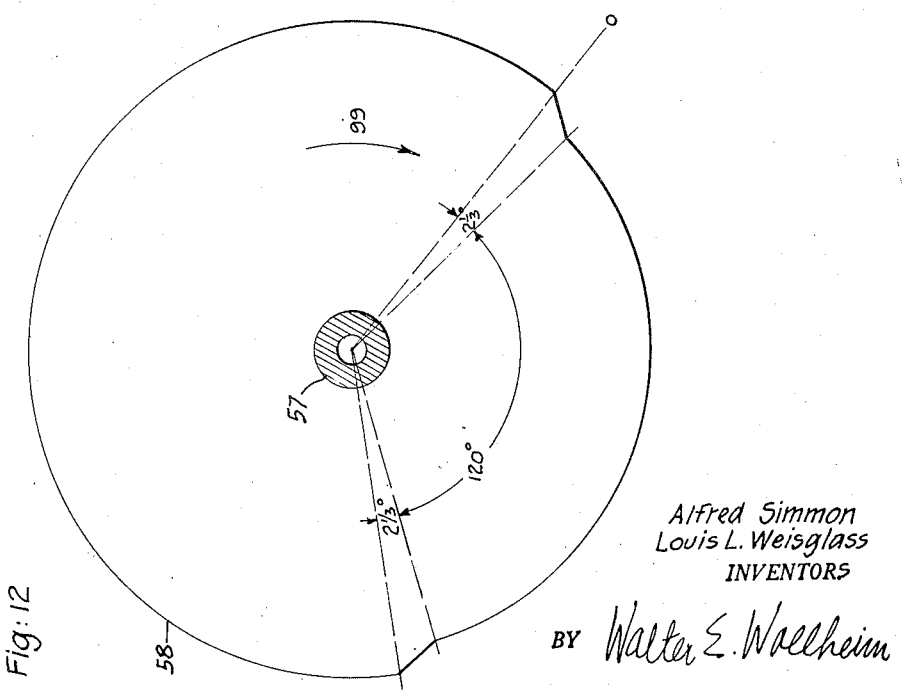

Cam 58 is shown in Fig. 12. This cam has one segment with a relatively short radius extending over an angle of 120° and another segment extending substantially over an angle of 240° having a larger radius. This cam rotates during operation in the direction of arrow 99.

Cams 59 and 60 have the same shape as cam 58, but are offset with respect to cam 58 and each other by an angle of 120° each. Cams 58, 59 and 60 withhold, during operation, always two of the three masking slides as will be explained later.

*Lever assembly*

A cross-sectional view through the lever assembly is seen in Fig. 4. Three levers are co-axially mounted on shaft 70, and three other levers are coaxially mounted on shaft 71. Each lever comprises a central part which contains the bearings by means of which the lever is pivoted on its respective shaft. Fastened to the central part of each lever is a lower arm which is in operative engagement with one of the cams and an upper arm which, in turn, transmits the cam motions to one of the mechanisms to be described later. Referring to Fig. 4, there are pivoted co-axially on shaft 70 levers 72, 73 and 74. Lever 72 has a lower arm 72' and an upper horizontal arm 72''. In like manner, arms 73' and 73'', and 74' and 74'' are, respectively, attached to levers 73 and 74. As can be seen, the lower arms 72', 73' and 74' are equipped with cam following rollers.

Two of the three levers pivoted on shaft 72 are of substantially identical design with the three levers just described. These levers are levers 75 and 77 with their lower arms 75' and 77' and their upper arms 75'' and 77''. The lower arms 75' and 77' are again equipped with cam following rollers. Lever 76 is somewhat different since its lower arm 76' is not equipped with the cam following rollers for reasons which will be explained later, and its upper arm 76'' is differently shaped from the other levers since it has three prongs 80, 81 and 82.

The two lever assemblies consisting of three levers each are again shown in axonometric views in Figs. 16 and 17.

*Support for color print material*

The support for the color print material can be seen in Fig. 11 as well as in cross-sectional view in Fig. 2. Fastened to the aforementioned plate 32 is a stationary pivot 100 on which turns a hub 101 fastened to plate 102. The plate 102 is of rectangular shape and has preferably the dimensions of 8'' x 10'' because that happens to be the standard size in which most color print materials are available. Suitable means such as spring clips are provided by means of which a sheet of this material can be fastened to this plate. Fastening means of this character are well known in the art and are, therefore, not shown here. Fastened to the lower side of plate 102 is a ratchet gear 103 which has a plurality of ratchet teeth, six in this case. A torsion spring 104 of the type used in clockwork motors has one of its ends 104' fastened to the inner wall of the ratchet gear. The other end of the spring 104'' is fastened to a stud 105 which is, in turn, attached to plate 32. During operation, the spring urges the ratchet gear 103 and the plate 102 to rotate in the direction of arrow 106. Before an exposure cycle, the operator, of course, must tension the spring by turning plate 102 in a direction opposite to arrow 106 for three revolutions.

The ratchet gear 103 cooperates with a pivoted lever 107 to form a step by step escapement movement. Lever 107 can be seen in Fig. 11 and is supported by a pivot 108. Pivot 108, in turn, is attached to plate 32. The escapement movement is completed by an additional lever 109 pivotally supported by a shaft 110 and a connecting bar 111 which connects one leg of lever 107 and link 109. The extreme right end of lever 111 is in operative contact with the upper arm 75'' of the lever 75 which was described in one of the preceding paragraphs. This lever and the cam 50 actuating this lever are shown in dotted lines in Fig. 11 and it can be seen that, if cam 50 rotates in the direction of arrow 97, its projections will actuate the lower arm 75' of lever 75 and thereby the upper arm 75'' of said lever. 75'' will then push part 111 to the left, thereby rotating lever 107. The left end of 107, 107' will thereby be lifted from one of the teeth 103' of ratchet 103, permitting it to pass, whereas the other end of lever 108, namely 107'', will move to the left obstructing temporarily the path of teeth 103'' of ratchet 103. After the projection of cam 50 has passed the cam following roller fastened to 75', lever 75 with its two arms 75' and 75'' will return into its original position, permitting link 109 and lever 107 to do likewise, since they are biased by spring 104. This, in turn, permits the lower end 107'' of lever 107 to permit tooth 103'' to pass, whereupon ratchet gear 103 completes ⅙ of the revolution. In other words, every time one of the projections of cam 50 passes the cam following roller mounted on 75', the escapement movement permits one tooth of the ratchet gear 103 to pass in two steps, so that the ratchet gear 103 with the supporting plate 102 performs, again in two steps, a movement of ⅙ of a revolution.

*Hinged top*

The second principal part of the supporting structure is a hinged top which is shown in detail in Figs. 6a, 6b, 6c and 6d. It comprises a thin plate 120, the outline of which can be seen in Fig. 6a and which has a triangular aperture 121; the outline of this aperture in the working position has been shown in dotted lines in Fig. 11. Mounted on this thin aperture plate are three thicker plates 122, 123 and 124. These three plates are approximately ¼'' thick and preferably made from sheet aluminum. On top of these three plates is mounted an additional plate 125 which is substantially of triangular shape and which also has a triangular aperture somewhat larger than the triangular aperture 121. It is the purpose of piece 125 to give rigidity to the entire structure since the thin aperture plate 120 alone would obviously be unable to do so. It can be seen that three channels are formed by the aperture plate 120 and the heavier plates 122, 123 and 124. These three channels receive the masking slides which will be described later. An additional plate 126 is fastened partly to plate 125 and partly by means of a spacer 127 to plate 123. Plate 126 serves as a support for the escapement mechanism which controls the rotating and indexing movement of the filter unit. A projection 128 of plate 123 rests during the exposure cycle on the spacer 33 of the base assembly as shown in Fig. 5b. Two lugs 129 and 130 are attached to the left side of plates 122 and 124, respectively. By means of these lugs 129 and 130 the top is hingedly attached to the corresponding lugs 32 of the base assembly as shown in Fig. 5a and 5b.

Masking slides

It is the purpose of masking slides to expose a triangular area of the test print in such a way that one of the corners of the triangle receives full exposure for a selected time, the side opposite said corner receiving no exposure, and intermediate points receiving intermediate exposures in linear proportion to their distance from said side. Each slide is essentially a square piece of thin sheet metal, usually provided with some lugs to which the associated mechanism can be attached, and three slides of this type are provided at slightly different levels, so that the triangle can be exposed three times to three different colors, respectively, each slide subjecting one of the corners, respectively, and its opposite side to the treatment just outlined. As will be seen from the drawings, cam 51 and lever 76, by themselves, would move all three slides simultaneously, if it were not for the action of the three withholding cams 58, 59 and 60. These withholding cams, including the levers 72, 73 and 74 actuated by them, always withhold two of these slides from the triangular area, whereupon, of course, cam 51 and lever 76 can actuate only one slide at a time, this slide being the one which happens to be withheld by the three withholding cams 58, 59 and 60. Since the three withholding cams are offset with respect to each other by an angle of 120°, it follows that by this arrangement the three masking slides are actuated in rotation, one at a time.

The exposure of the triangular area can be done in two different ways. We can start with a triangle fully exposed and cover or mask its area gradually during the exposure time, covering one of the sides of the triangle first and the corner opposite said side last, or we could reverse the procedure and start with the triangle completely covered and expose the corner first, adjacent areas thereafter, and the side opposite said corner last. The two methods are perfectly equivalent and, merely as a matter of example, we have chosen in our embodiment of this invention to show the latter method. After the triangle has been completely exposed at the end of a part exposure, the exposure must in theory be terminated instantaneously, and in practice, at least very fast. This can be done, for example, by switching off the lamp from which the exposing light originates, but in the interest of simplicity, we merely permit the masking slides to return quickly, and this is the reason why the lower arm 76'' of lever 76 is not equipped with a cam following roller, but merely with a knife edge since, in this manner, a more rapid return is possible than with a roller.

The three masking slides with their respective actuating mechanism are shown in Figs. 8, 9 and 10. A cross-sectional view through the actuating mechanism can also be seen in Fig. 3.

Referring to Fig. 8, we have one of the masking slides 140. Two pivots 141 and 142 are attached to this slide, these pivots engaging two levers 143 and 144. Lever 144 is biased by a spring 145. Levers 143 and 144 are supported by stationary pivots 146 and 147 which, in turn, are attached to the hinged top of the device or, more specifically, to the aluminum plate 122 shown in Fig. 6a. Lever 144 has been extended beyond pivot 147 and is there hingedly attached to the left end of connecting rod 148. The right end of the connecting rod 148 is pivoted to an arm 149'. This arm is supported by a stationary pivot 150 and is part of a pivoted lever which can be seen in Fig. 3. It contains a central part 149 which surrounds pivot 150, lower arm 149' to which the aforementioned connecting rod 148 is attached, and an upper arm 149'' which carries a roller 151. This roller is relatively high so that it can be in operative contact with the upper arm 74'' of lever 74 as well as with prong 80 of the three prongs of upper arm 76'' of lever 76. Lever 74 is actuated by one of the withholding cams 60, and lever 76 is actuated by cam 51, and depending upon the angular position of cam 60, slide 140 either covers the area 121 of the triangular test print, shown in dotted lines in Fig. 8, or it is withheld therefrom; this is the position which is shown in Fig. 8. When it is withheld, the action of lever 76 is of no consequence. During the time, however, which cam 60 does not withhold slide 140 from the area 121, the movements of slide 140 are determined by the action of lever 76 or indirectly by cam 51.

The second masking slide with its associated mechanism is shown in Fig. 9. The slide 160 carries again two pivots 161 and 162 which are, in turn, connected to levers 163 and 164. The other end of these levers are supported by stationary pivots 165 and 166. These pivots are fastened to the hinged top of the device or, more specifically, to the aluminum plate 123 as shown in Fig. 6a. Referring again to Fig. 3, it can be seen that lever 164 is attached to a hub 167 to which is fastened an upper arm 168. This upper arm carries a roller 169 which has the same dimensions as the aforementioned roller 151 and moves in a plane directly below the plane in which the roller 151 moves. The roller 169 can be actuated either by the upper arm 73'' of lever 73, or by the prong 81 of the three prongs of arm 76'' of lever 76. The interaction of levers 76 and 73 is precisely the same as the interaction between levers 76 and 74 as described above. Again, the masking slide is shown in a position in which it is being withheld from the triangular area 121 by the action of cam 59 and lever 73.

The third masking slide is shown in Fig. 10. Slide 170 carries two pivots 171 and 172 to which two levers 173 and 174 are linked. Levers 173 and 174 are supported by stationary pivots 175 and 176 which are again fastened to the plate 123 of the hinged top assembly. Lever 173 is extended beyond pivot 175, and this extension is called 177 and carries a roller 178. This roller has the same dimensions as the two aforementioned rollers 151 and 168 and moves in a plane directly below them. It is again in operative contact with two elements, the upper arm 72'' of lever 72 which, in turn, is actuated by withholding cam 58, and with the prong 82 of the upper arm 76'' of lever 76 which, in turn, is actuated by cam 51. In the position shown in Fig. 10, this masking slide is not being withheld from the triangular area 121 and, therefore, covers this area. Part of the cam 51 is shown in dotted lines including one of the spiral shaped abutments, and it will be clear that as soon as this abutment, during its rotation in the direction of arrow 96, actuates the knife edge of the arm 76' of lever 76, the upper arm 76'' of this lever will push roller 178 to the left, causing levers 177 and 173 to rotate around pivot 175 in a counter-clockwise direction. This, in turn, will cause the movement of masking slide 170 across the triangular area 121 in the direction of arrow 180, and since the levers 173 and 174 are relatively long, this movement will be done in a very flat arc, closely approximating a straight line.

Filter unit

The filter unit is shown in Fig. 7 and in cross-sectional view in Fig. 2. Its basic design is very similar to the design of the support for the color print material.

The filter unit consists of the rotatable and indexing filter support and of the escapement mechanism.

Fastened to the hinged top of the device or, more specifically, to part 125 thereof is a stationary shaft 185. This shaft carries a rotatable disc 186 which has three triangular apertures 187, 188 and 189 which are closed by three filters, usually representing the three primary colors and made from colored gelatin or some other suitable material. Fastened to disc 186 is a hub 190, and a spring 191 is provided which urges the entire assembly to rotate in a counter-clockwise direction. The outer circumference of part 186 is equipped with teeth 191, 192 and 193 and a projection 194 which acts as a stop coming in contact with a stud or pin 195 fastened to plate 122 of the hinged top.

The escapement mechanism is mounted on plate 126 which was described in the preceding paragraph on the "Hinged top." It consists of a lever 200, a lever 201, a connecting link 202, and a biasing spring 203. Lever 200 is pivotally supported by a pivot 204 and has an upper end 200' forming a hook and a lower end 200".

Levers 200, 201 and 202 are shown singly at the lower right hand corner of Fig. 7 to illustrate their shapes more clearly. A part of cam 52, as well as lever 77 with its two arms 77' and 77", are shown in dotted lines. Before an exposure, the filter unit is tensioned by the operator by turning it in a clockwise direction until tooth 191 is retained by the hook 200' of lever 200. During operation, cam 52 moves in the direction of arrow 98, and as soon as the projection on cam 52 comes in contact with the cam following roller mounted on 77', lever 77 with its upper arm 77" will rotate slightly, moving part 202 to the left. This imparts a slight rotary movement to lever 200 and its hook 200' releases one of the teeth 192, as shown. At the same time, the lower end of lever 200, namely 200", will move into the path of the following tooth 193, in this instance. The result is that hook 200' lets one tooth pass, whereupon the disc rotates 30°, until the next tooth comes in contact with the lower end 200" of lever 200. The cam abutment of cam 52 then passes the cam following roller of lever 77 which now returns into its original position, permitting elements 201, 202 and 200 to do likewise. The tooth of disc 186 which was stopped by the lower end 200" of lever 200 can now continue its rotation until it is caught by hook 200'. During this period, disc 186 performs a rotation of another 30°, so that altogether the disc 186 moves 60°. Since the three filters are offset with respect to each other by 60° this means that each actuation of the escapement movement brings another filter into the operating position in front of the triangular aperture 121.

Operation

The operation of the device can be fully understood from the foregoing description.

Before the start of a test exposure, the hinged top is lifted, as shown in Fig. 1 in dotted lines. The rotatable platform 102 is then rotated by hand three times in a clockwise direction, whereby the spring 104 is being tensioned. A sheet of the photographic color print material to be tested is then fastened to this platform 102, and the hinged top is permitted to assume its operating position, as shown in Fig. 1 in solid lines. The filter support is then turned by hand in a clockwise direction until the extreme tooth 191 is retained by the hook 200' of the escapement lever 200. It is assumed that all cams at this time have relative positions as shown in Figs. 12, 13, 14 and 15. If the cams are not in their starting position, it is merely necessary to let motor 40 run for a while and stop it at the proper instance. The device is now ready for operation.

For the exposure, a suitable source of light is placed above the center of the triangular area 121. This source of light may be of any convenient type, but it should, of course, have a color temperature identical with the one to which the color print material is later to be subjected during the making of actual prints. A convenient source of light for this application is an ordinary photographic enlarger, in which case the test device is merely placed on the easel of this enlarger.

The motor is then started and the operation begins. For the first three minutes all triangles are subjected to an exposure of, for example, green light. The upper corners of all triangles receive full exposure times, these exposure times ranging from six to twenty seconds, depending upon the angular extension of the spiral shaped cam abutments of cam 50. Due to the action of the masking slide, the rest of each triangle receives a graduated exposure ranging from a full exposure time at the corner to zero at the opposite side. During these first three minutes, the withholding cams 58, 59 and 60 make one third of a revolution and withhold during this time two of the three masking slides. The three other cams 50, 51 and 52 perform one full revolution. Cam 51 actuates the third of the masking slides, i. e., the one which is not being withheld by the action of the withholding cams.

The projections of cam 50 actuate the escapement movement which controls the rotation and indexing of the platform 102 on which the color print material is mounted. This rotation and indexing movement takes place between part exposures executed by cam 51 and the masking slide, due to the fact that the projections of cam 50 are placed so that they fall within the gaps between spiral shaped cam abutments of cam 51.

Cam 52 has only one projection which actuates the escapement movement that controls the rotation and indexing of the filter mount. This takes place after platform 102 has made one full revolution, i. e., after one set of six triangles in our example, has been subjected to graduated part exposures with green light.

For the next three minutes, this process is being repeated, but now all triangles are subjected to a graduated exposure of red light, the lower right hand corner receiving full exposure decreasing to zero at the opposite side of the triangle. The exposure times again range from six to sixty seconds as determined by the angular extensions of the cam abutments of cam 51. The action of all cams is the same as during the previous cycle, but now another set of two masking slides is being withheld, permitting another slide to be actuated during this three minute cycle.

During the last three minutes this process is being repeated again, but now all triangles are being exposed to a graduated exposure of blue light, the left hand lower corners receiving full exposure and the opposite sides receiving zero exposure of blue light. A complete cycle in the described example lasts nine minutes and produces six triangles which are subjected to combined exposure times ranging from 3×6=18 seconds to 3×60=180 seconds, respectively.

The entire cycle of operation can be illustrated by a motion diagram which is, in reality, merely a development of the circumference of the various cams and which is shown in Fig. 18. The upper three cams are the withholding cams and the elements actuated by these withholding cams may assume two positions, depending upon whether the cam following roller of this particular cam is on the segment with the large or the segment with the short radius. In the diagram we have called the two positions "held open" and "permitted to close." This means that in the latter position the action of the withholding cam alone would permit the masking slide to close except for the action of lever 76 and cam 51. As has been explained, these two elements tend to actuate all three masking slides simultaneously, but since two of them are already withheld by the action of the withholding cams, only one of the masking slides, i. e., the one which happens not to be withheld at the time, can perform an exposure movement. Since the three withholding cams are offset with respect to each other by an angle of 120°, the exposure slides will be actuated in proper rotation by elements 76 and 51. The fourth cam is called the support indexing cam and its motion diagram in Fig. 18 indicates when this cam will actuate the rotating and indexing movement of the support 102. The fifth cam is called the exposure cam and shows a number of triangular figures of equal height, but different lengths, representing the developments of the spiral shaped cam abutments of cam 51. The actions of these spiral shaped cam abutments produce movements of the exposure slides with constant speed for each part exposure. This speed, however, decreases for each following cam abutment, or each following part exposure becomes longer. On the diagram the times which elapse during the action of each cam abutment, as well as the times which elapse between action of adjacent cam abutments, are marked above the diagram of the exposure cam, and the times which elapse from the start of the device, zero at the extreme left, to each particular point of the exposure cycle are marked below the motion diagram of the exposure cam. As can be seen, the part exposures range from six to sixty seconds and three and one half seconds are allowed between part exposures. At the end of each of the three 3 minute cycles an additional rest period of five seconds has been allowed which permits the withholding cams to change their relative positions.

The last cam is the filter indexing cam which is shown in Fig. 7 and which controls the rotation and indexing of the filter support. This cam has only one projection which goes into action once every three minutes as can be seen in the motion diagram.

A schematic diagram of the finished print is shown in Fig. 19. A group of six triangles is arranged symmetrically around a common center which, of course, is the center of rotation of plate 102. The corners of each trangle show the respective colors of the part exposures, i. e., all upper corners are green, all lower right hand corner are red, and all lower left hand corners are blue. Within the triangle the colors lose their luminosity more and more until in the center of the triangle a neutral gray prevails, under the assumption, of course, that the color print material is well balanced. Otherwise, the region of neutral gray will not be in the middle of the triangular area but shifted towards one of the corners. Since the six triangles are receiving widely different exposure times, their relative density will, of course, vary considerably. Color print material of the monopack type is usually reversed during processing, i. e., prints get lighter with increasing exposure time. Consequently, the first triangle which receives the shortest exposure time will appear almost black, the corners merely showing traces of very dark green, red and blue colors. For subsequent triangles, the colors will become lighter, and perhaps the third or fourth triangle will show the most luminous colors From then on, with increasing exposure times, the colors will fade out and, instead of a black or gray area in the middle, a white spot will appear. The last triangle which is, of course, much overexposed, will be almost entirely white with merely a weak tint of green, red and blue in the respective corners. It will be understood that in this manner, complete information about the behavior of the color print material to various exposure conditions can be obtained. It is possible to determine the sensitivity of the color print material as well as the color balance, and in the case of unbalance, the magnitude of any corrective measures which must be applied during subsequent exposures of actual prints, can be estimated.

It will be understood that the device as described above is merely a preferred embodiment and that many of the detailed design features may be widely changed as long as the broad principle is being maintained. Two different possibilities for the actuation of the masking slides have already been mentioned. Another possible change is, for example, the construction of the filter holder which must not necessarily be designed in the manner shown in Fig. 7. It may be more convenient to put a small replica of this design directly in front of the source of light to which this device is being exposed, actuating it, for example, by an electro-magnet which, in turn, is actuated by a switch operated by cam 52. Other obvious modifications of a like nature will readily occur to anybody skilled in the art, and these modifications should be construed to fall within the scope of this invention, as defined in the appended claims.

What we claim as new is:

1. A device for making test prints on photographic color print material of the monopack type comprising means to subject each of a plurality of areas of triangles on a single sheet to three successive part exposures, means to change the color of the light for each part exposure, and means to distribute the light during these part exposures non-uniformly over each of said areas, comprising means to mask progressively portions of each of said triangles during each part exposure, whereby each corner of each of said triangles receives a full exposure to light of one color and the side opposite said corner receives no exposure to light of said color, intermediate points receiving exposures of all three colors, the relative exposures of each point to light of each color depending upon its relative distance from the three sides of each of said triangles, means to make the sum of all three part exposures a constant over the area of any of the triangles, and means to render said constant of a different magnitude for different triangles, said device including a supporting structure consisting of two principal parts, the first part serving as a base, and the second part hingedly attached thereto, said first principal part supporting a motor drive, a cam assembly comprising a plurality of rotatable cams driven by said motor unit, a lever assembly comprising a plurality of pivoted levers actuated by said cam assembly, and a support for said color print material including means in operative connection with said lever assembly to rotate and to index said support between exposures, said second principal part supporting an aperture plate with a triangular aperture, normally positioned in front of said support for said sheet, three masking slides, each slide having one straight edge parallel to one side of said triangular aperture, supporting means for said slides including members actuated by said lever assembly, said slides adapted to be moved in rotation by said members, during each part exposure one slide being moved across said triangular aperture in a direction substantially at right angles to its straight edge, while the two other slides are being withheld, a filter unit including a support for three filters of three different colors, respectively, and means in operative connection with said lever assembly to rotate and index said filter support between exposures, said second principal part normally positioned above said first principal part in substantially parallel relationship thereto, but adapted to be lifted therefrom by virtue of being hingedly attached thereto, whereby said support becomes accessible for the insertion of a sheet of color print material.

2. A device according to claim 1, said cam assembly comprising six cams, each of the first three cams being of substantially circular shape and comprising one segment with a relatively large and one segment with a relatively short radius, one of said segments covering an angle on the circumference of said cam of substantially 120° and the other segment covering an angle of substantially 240°, these three cams mounted on a common axis, offset with respect to each other by an angle of 120° and adapted to withhold in rotation through three of the levers of said lever assembly two of the three masking slides during each part exposure, the fourth cam being of substantially circular shape, carrying at least one relatively short projection and adapted to actuate between exposures through one of the levers of said lever assembly the rotary and indexing movement of said filter support, the fifth cam being of substantially circular shape carrying a plurality of spiral shaped projections, these spiral shaped projections being of the type that has a linear equation in a system of polar coordinates, different spiral shaped projections covering different angles on the circumference of this cam and relatively short gaps provided between adjacent spiral shaped projections, this cam adapted to actuate in rotation for each part exposure through one lever of said lever assembly that of the three masking slides that is not being withheld by the first named three cams, the sixth cam being of substantially circular shape carrying a number of relatively short projections, the lengths and relative positions of said last named short projections on the circumference of this cam being the same as the lengths and relative position of the gaps between the spiral shaped projections on the circumference of the fifth cam, this cam adapted to actuate between part exposures the rotary and indexing movement of said support for said sheet of color print material through one of the levers of said lever assembly, said last named three cams mounted on a common axis.

3. A device according to claim 1, said cam assembly comprising six cams, each of the first three cams being of substantially circular shape and comprising one segment with a relatively large and one segment with a relatively short radius, one of said segments covering an angle on the circumference of said cam of substantially 120° and the other segment covering an angle of substantially 240°, these three cams mounted on a common axis, offset with respect to each other by an angle of 120° and adapted to withhold in rotation through three of the levers of said lever assembly two of the three masking slides during each part exposure, the fourth cam being of substantially circular shape, carrying at least one relatively short projection and adapted to actuate between exposures through one of the levers of said lever assembly the rotary and indexing movement of said filter support, the fifth cam being of substantially circular shape carrying a plurality of spiral shaped projections, these spiral shaped projections being of the type that has a linear equation in a system of polar coordinates, different spiral shaped projections covering different angles on the circumference of this cam and relatively short gaps provided between adjacent spiral shaped projections, this cam adapted to actuate in rotation for each part exposure through one lever of said lever assembly that of the three masking slides that is not being withheld by the first named three cams, the sixth cam being of substantially circular shape carrying a number of relatively short projections, the lengths and relative positions of said last named short projections on the circumference of this cam being the same as the lengths and relative position of the gaps between the spiral shaped projections on the circumference of the fifth cam, this cam adapted to actuate between part exposures the rotary and indexing movement of said support for said sheet of color print material through one of the levers of said lever assembly, said last named three cams mounted on a common axis, the first named three cams forming a unit that rotates on one pivot, and the last named three cams forming another unit that rotates on another pivot, and two gears associated with these units and in mesh with each other with a ratio 3:1, whereby the first unit rotates once, and the second unit rotates three times during one complete exposure cycle to which said color print material is being subjected.

4. A device according to claim 1, said cam assembly comprising six cams, each of the first three cams being of substantially circular shape and comprising one segment with a relatively large and one segment with a relatively short radius, one of said segments covering an angle on the circumference of said cam of substantially 120° and the other segment covering an angle of substantially 240°, these three cams mounted on a common axis, offset with respect to each other by an angle of 120° and adapted to withhold in rotation through the first three levers of said lever assembly two of the three masking slides during each part exposure, the fourth cam being of substantially circular shape, carrying at least one relatively short projection and adapted to actuate between exposures through the fourth lever of said lever assembly the rotary and indexing movement of said filter support, the fifth cam being of substantially circular shape carrying a plurality of spiral shaped projections, these spiral shaped projections being of the type that has a linear equation in a system of polar coordinates, different spiral shaped projections covering different angles on the circumference of this cam and relatively short gaps provided between adjacent spiral shaped projections, this cam adapted to actuate in rotation for each part exposure through the fifth lever of said lever assembly that of the three masking slides that is not being withheld by the first named three cams, the sixth cam being of substantially circular shape carrying a number of relatively short projections, the lengths and relative positions of said last named short projections on the circumference of this cam being the same as the lengths and relative position of the gaps between the spiral shaped projections on the circumference of the fifth cam, this cam adapted to actuate between part exposures the rotary and indexing movement of said support for said sheet of color print material through the sixth lever of said lever assembly, said last named three cams mounted on a common axis, said lever assembly comprising six pivoted levers, each lever having a center part adapted to rotate on a pivot and extending substantially parallel thereto, a lower arm attached to said center part and on substantially the same level as, and in operative contact with, the corresponding cam of said cam assembly, and an upper arm attached to said center part, the upper arms of the first three levers arranged substantially at the respective levels of said supporting means for the three masking slides and adapted to withhold in rotation two of the three masking slides for each part exposure, the upper arm of the fourth lever arranged substantially at the level of the filter unit and adapted to actuate its rotating and indexing movement, the upper arm of the fifth lever comprising three parallel prongs arranged at the respective levels of said supporting means for the three masking slides, and adapted to actuate during each part exposure that of said three supporting means that is not being withheld by two of the three first named levers during that part exposure, the upper arm of the sixth lever arranged substantially at the level of the support for said sheet of color print material and adapted to actuate its rotating and indexing movement.

5. A device according to claim 1, said support for said sheet of color print material with its associated rotating and indexing means comprising a turn table with a flat surface, including means to fasten said sheet to said surface, means urging said turntable to rotate, a ratchet gear with a plurality of teeth attached to said turntable, and a pivoted ratchet mounted on said first principal part of said supporting structure, including means to actuate said ratchet by one of the levers of said lever assembly, said ratchet gear and said ratchet forming an escapement movement, by means of which said turntable may be rotated and indexed between exposures.

6. A device according to claim 1, said filter unit with its associated rotating and indexing means comprising a rotatable support for three different color filters, means urging said support to rotate, at least three ratchet teeth attached to said support, and a pivoted ratchet mounted on said second principal part of said supporting structure, including means to actuate said ratchet by one of the levers of said lever assembly, said ratchet teeth and said ratchet forming an escapement movement by means of which said filter unit may be rotated and indexed.

7. A device for making test prints on photographic color print material of the monopack type comprising means to subject the area of a triangle on a sheet of said material to three successive part exposures, means to change the color of the light for each part exposure, and means to distribute the light during these part exposures non-uniformly over the area of said triangle comprising three separate means to mask progressively portions of said triangle during each part exposure, the first masking means comprising a first movable blade made from opaque sheet material and having a straight edge parallel to the first side of said triangle, and a first mechanism adapted to move said first blade during the first part exposure across said triangular area in a direction substantially at right angles to the first side of said triangle, and to keep said first blade stationary during the second and third part exposures, the second masking means comprising a second movable blade made from opaque sheet material and having a straight edge parallel to the second side of said triangle, and a second mechanism adapted to move said second blade during the second part exposure across said triangular area in a direction substantially at right angles to the second side of said triangle, and to keep said second blade stationary during the first and third part exposures, the third masking means comprising a third movable blade made from opaque sheet material and having a straight edge parallel to the third side of said triangle, and a third mechanism adapted to move said third blade during the third part exposure across said triangular area in a direction substantially at right angles to the third side of said triangle, and to keep said third blade stationary during the first and second part exposures, said aforementioned means to subject said triangular area to three successive part exposures including means to cause said three mechanisms to function consecutively, whereby during the first of said three successive part exposures the first corner of said triangle receives a full exposure to light of a first color, the side of said triangle opposite said corner receives no exposure to light of said first color, and intermediate points within said triangular area receive less than full exposure to light of said first color in accordance with their respective distance from said side, and whereby this process is repeated during the second part exposure with light of a second color and with respect to the second corner of said triangle, and during the third part exposure with light of a third color and with respect to the third corner of said triangle, the total exposure time of each point being the sum of all three part exposures.

8. A device according to claim 7, including means to render the sum of all part exposures constant over the area of said triangle comprising means to actuate said masking means with a uniform rate of speed, said rate being the same for all three part exposures.

9. A device according to claim 7, each of said blades, before each respective part exposure and before beginning its movement, completely exposing said triangle and masking, during its movement, first one of the sides of said triangle, then gradually more of said triangle, and finally the complete triangle, and means to terminate each of the three part exposures when the straight edge of the respective blade reaches the corner opposite that side of said triangle to which it is parallel.

10. A device according to claim 7, each of said blades, before each respective part exposure and before beginning its movement, completely covering said triangle and exposing during its movement first one of the corners of said triangle, then gradually more of said triangle, and finally the complete triangle, and means to terminate each of the three part exposures when the straight edge of the respective blade reaches that side of the triangle to which it is parallel.

11. A device for making test prints on photographic color print material of the monopack type comprising means to subject each of a plurality of triangular areas on a single sheet of said material to three successive part exposures, means to change the color of the light for each part exposure, and means to distribute the light during these part exposures non-uniformly over the area of said triangle comprising three separate means to mask progressively portions of said triangle during each part exposure, the first masking means comprising a first movable blade made from opaque sheet material and having a straight edge parallel to the first side of said triangle, and a first mechanism adapted to move said first blade during the first part exposure across said triangular area in a direction substantially at right angles to the first side of said triangle, the second masking means comprising a second movable blade made from opaque sheet material and having a straight edge parallel to the second side of said triangle, and a second mechanism adapted to move said second blade during the second part exposure across said triangular area in a direction substantially at right angles to the second side of said triangle, the third masking means comprising a third movable blade made from opaque sheet material and having a straight edge parallel to the third side of said triangle, and a third mechanism adapted to move said third blade during the third part exposure across said triangular area in a direction substantially at right angles to the third side of said triangle, said aforementioned means to subject each triangular area to three successive part exposures including means to cause said three mechanisms to function consecutively, said means to subject each of a plurality of areas of triangles on a single sheet to three successive part exposures comprising a support for said sheet, an aperture plate with a triangular opening in front of said support and said sheet, and means to move said support relative to said aperture after a triangle has received three part exposures, whereby during the first of said three successive part exposures the first corner of each triangle receives a full exposure to light of a first color, the side of said triangle opposite said corner receives no exposure to light of said first color, and intermediate points within said triangular area receive less than full exposure to light of said first color in accordance with their respective distance from said side, and whereby this process is repeated during the second part exposure with light of a second color and with respect to the second corner of said triangle, and during the third part exposure with light of a third color and with respect to the third corner of said triangle, the total exposure time of each point being the sum of all three part exposures.

12. A device according to claim 11 including means to make the sum of all three part exposures a constant over the area of any of the triangles, and means to render said constant of a different magnitude for different triangles, said two last named means comprising means to actuate said masking means with a uniform rate of speed, said rate of speed being the same for the three part exposures to which each triangle is being subjected, but being different for different triangles.

13. A device according to claim 11, said means to subject each of a plurality of areas of triangles on a single sheet to three successive part exposures comprising a stationary aperture plate with a triangular aperture, a rotatable support for said sheet, said support being positioned behind said aperture plate and its axis of rotation substantially coinciding with one of the corners of said triangular aperture, and means to rotate and index said support between exposures, whereby a plurality of triangular test exposures may be grouped symmetrically around a common center, said triangles together covering a polygonal area.

ALFRED SIMMON.
LOUIS L. WEISGLASS.

REFERENCES CITED

The following references are of record in the file of this patent:

UNITED STATES PATENTS

| Number | Name | Date |
| --- | --- | --- |
| 287,938 | Hosch | Nov. 6, 1883 |
| 884,254 | Zander | Apr. 7, 1908 |
| 2,165,167 | Hardy | July 4, 1939 |
| 2,223,008 | Michaelis | Nov. 26, 1940 |